United States Patent [19]

Nelson

[11] 4,237,571
[45] Dec. 9, 1980

[54] FLOOR POLISHER WITH GEAR DRIVE

[75] Inventor: Bertel S. Nelson, Naperville, Ill.

[73] Assignee: Clarke-Gravely Corporation, Muskegon, Mich.

[21] Appl. No.: 39,314

[22] Filed: May 16, 1979

[51] Int. Cl.³ .................... A47L 11/162; A47L 11/40
[52] U.S. Cl. ..................................... 15/49 R; 51/177
[58] Field of Search ................ 15/49 R, 50 R, 51, 52, 15/87, 180, 385; 51/170 T, 177; 74/421; 308/36.1

[56] References Cited

U.S. PATENT DOCUMENTS

| | | | |
|---|---|---|---|
| 1,847,323 | 3/1932 | Yutzier et al. | 15/49 R |
| 2,026,006 | 12/1935 | Wennerstrom | 15/49 R X |
| 2,218,893 | 10/1940 | Schlesinger | 15/49 R X |
| 2,221,315 | 11/1940 | Okun | 15/49 R X |
| 2,468,929 | 5/1949 | Holt et al. | 15/49 R X |
| 2,674,896 | 4/1954 | Arones | 15/49 R X |
| 3,011,190 | 12/1961 | Wilke | 15/49 R |
| 3,074,089 | 1/1963 | Brown, Jr. | 15/49 R |
| 3,087,078 | 4/1963 | Brown | 15/49 R X |

*Primary Examiner*—Edward L. Roberts
*Attorney, Agent, or Firm*—Price, Heneveld, Huizenga & Cooper

[57] ABSTRACT

A compact floor polisher is disclosed including a base supporting an electric motor having a vertically oriented output shaft and driving a circular brush. The base includes a depending annular skirt and a hollow hub. A brush carrier has an annular flange and a spindle rotatably supported by bearings within the hub. The brush carrier and support base define a lubricant housing. A ring gear is formed on the annular flange of the carrier and engaged by a pinion gear secured to the motor output shaft. A seal is disposed between the vertical flange and the annular skirt. Baffles direct lubricant into the hub to lubricate the bearings supporting the brush carrier spindle.

25 Claims, 7 Drawing Figures

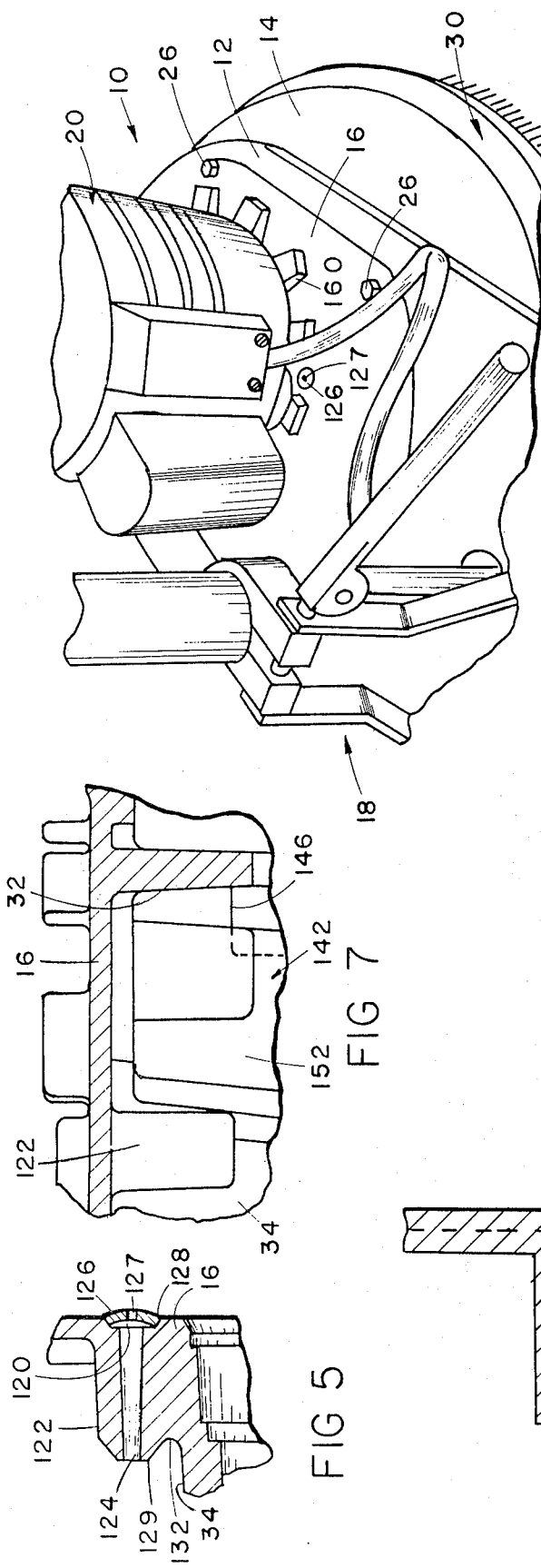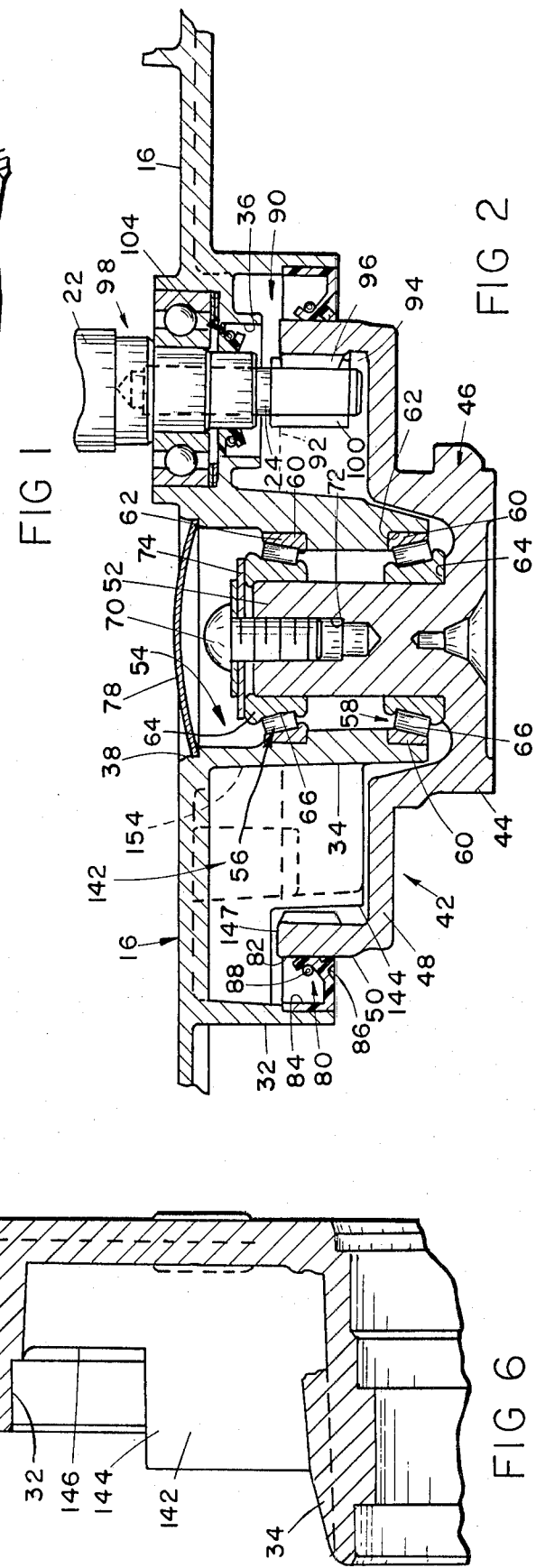

FLOOR POLISHER WITH GEAR DRIVE

CROSS REFERENCE TO RELATED APPLICATION

This application is related to application Ser. No. 039,313, filed on even date herewith in the names of Wilfred C. Nise and Bertel S. Nelson and entitled FLOOR POLISHER.

BACKGROUND OF THE INVENTION

The present invention relates to floor maintenance apparatus and more particularly to rotary floor polishers.

Floor maintenance machines are used for scrubbing, stripping, polishing or buffing a floor surface. Such machines typically have a rotary floor treating element engaging the floor surface and rotated about its vertical axis by an electric motor, a drive transmission between the motor and the brush and an operator's handle. The machine rests on the floor surface and is typically swept through an arc by variations in pressure exerted on the control handle by the operator. In commercial applications, such machines are subjected to heavy use and must be reliable in operation. Reliability may be sacrificed due to competing desirable attributes such as ease of operation, ease of maintenance, ease of storage, low noise levels during operation and ease of and cost of manufacture.

Examples of prior floor maintenance machines may be found in U.S. Pat. No. 1,847,323, entitled FLOOR MACHINE and issued on Mar. 1, 1932 to Yutzler et al, U.S. Pat. No. 2,348,268, entitled FLOOR SCRUBBING MACHINE and issued on May 9, 1944 to Smith, U.S. Pat. No. 2,561,279, entitled FLOOR MAINTENANCE MACHINE and issued on July 17, 1951 to Holt, U.S. Pat. No. 2,817,977, entitled DRIVE UNIT FOR FLOOR TREATING MACHINES and issued on Dec. 31, 1957 to Holt, U.S. Pat. No. 3,074,089, entitled COMPACT MACHINE and issued on Jan. 22, 1963 to Brown, Jr., and U.S. Pat. No. 3,619,848, entitled APPLIANCE FOR CLEANING FLOORS and issued on Dec. 16, 1971 to Salzmann.

Prior art devices such as disclosed in the aforementioned U.S. Pat. No. 2,817,977, have supported the drive motor in co-axial relationship with a gear reduction unit and the circular brush element. The unit of this patent includes a closed chamber within which multiple gear sets transmit rotary motion. A liquid lubricant is employed to increase the life and hence reliability of the floor treating machine and also reduce noise levels associated with operation.

Mounting the drive motor in co-axial alignment with a drive unit and the brush element results in a vertical height of the polisher which may restrict the areas of usage of the device due to interference with structures found in a building. For example, the machine may not fit under tables or shelves.

Previous attempts to reduce the overall vertical height of the floor treating machines have included offsetting the electric motor from the vertical centerline of the rotary brush. An example of such an arrangement may be found in the aforementioned U.S. Pat. No. 1,847,323. A floor polisher is disclosed therein wherein the drive motor is mounted on a base plate in a position offset from the vertical centerline of a circular brush. Rotary motion is transmitted to the brush by a drive arrangement including a pinion gear secured to a vertically oriented motor output shaft and a ring gear carried by a brush carrier. The pinion gear and ring gear are positioned within a housing which defines a sealed lubricant chamber. With such an arrangement, problems may be experienced with providing adequate lubrication for a bearing structure which supports the brush carrier for rotary motion relative to the housing. Other problems which have been experienced with the prior art floor polishers as illustrated in the aforementioned patents are related primarily to difficulties in manufacture, complexity and in performing routine maintenance on the machines.

SUMMARY OF THE INVENTION

In accordance with the present invention, a unique compact floor treating machine and drive unit are provided whereby the problems heretofore experienced with respect to complexity, difficulty of manufacture, noise of operation, maintenance, and reliability are substantially alleviated or eliminated. Essentially, the machine includes a drive having a motor support base including an annular skirt and a hollow hub. A carrier includes an annular flange and a spindle. Bearing means are provided for supporting the spindle for rotary motion within the hub. Gearing interconnects the carrier with the vertically oriented output shaft of a motor. In narrower aspects of the invention, provision is made for sealing the space between the vertical flange and annular skirt and for directing lubricant into the hub to lubricate the bearing means supporting the spindle.

BRIEF DESCRIPTION OF THE DRAWINGS

FIG. 1 is a fragmentary, perspective view of the compact floor treating machine in accordance with the present invention;

FIG. 2 is a fragmentary, cross-sectional view of the floor treating machine showing the drive unit in accordance with the present invention;

FIG. 5 is a cross-sectional view taken generally along line V—V of FIG. 3;

FIG. 6 is a cross-sectional view taken generally along line VI—VI of FIG. 3; and FIG. 7 is a cross-sectional view taken generally along line VII—VII of FIG. 4.

DETAILED DESCRIPTION OF THE PREFERRED EMBODIMENT

Figure 4:
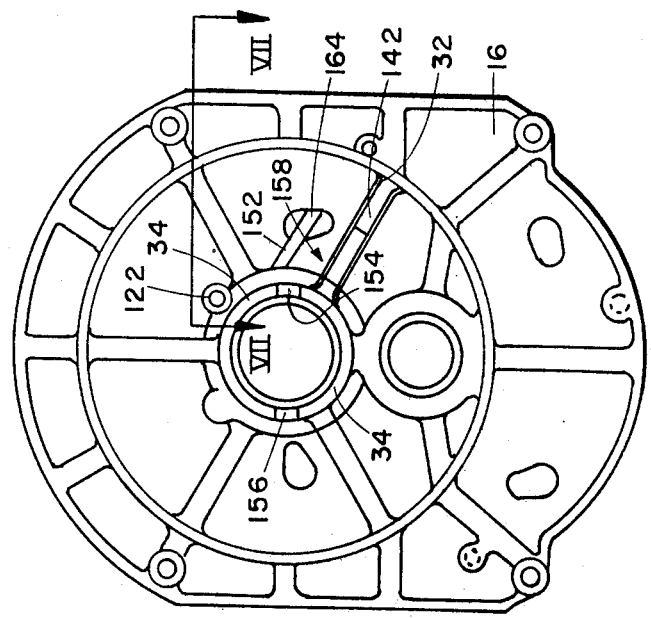
FIG. 4 is a bottom plan view of the base plate.

A compact rotary floor treating machine or floor polisher in accordance with the present invention is illustrated in FIG. 1 and generally designated 10. Machine 10 includes a frame 12 having a housing 14 secured thereto, a base plate 16 and operator's handle 18. Supported on base plate 16 is a motor housing 20 within which is disposed a conventional electric motor 22 having a vertically oriented output shaft 24. Base plate 16 is secured to frame 12 by suitable fasteners 26. As described in detail below, electric motor 22 rotates a rotary floor treating element 30 which is illustrated in FIG. 1 as a floor polisher brush. The brush 30 is rotated about its vertical axis.

As best seen in FIG. 2, base plate 16 is preferably a die cast member including an integral, depending, annular skirt 32 and a depending, hollow, cylindrical hub 34 concentrically positioned with skirt 32. Base plate 16 further defines a motor shaft aperture 36 and a bearing access aperture 38. Rotary floor treating element or brush 30 is detachably secured to a carrier 42. Carrier 42 includes a central hub 44 to which brush 30 is detachably secured in a conventional fashion by lugs 46. Carrier 42 is generally cup-shaped in section and includes a base or bottom wall 48, a peripheral, vertically extending, annular flange 50 and a centrally disposed, vertically extending spindle or shaft 52. Shaft 52 is concentric with flange 50.

Spindle 52 is supported for rotary motion within bore 54 of hub 34 by a pair of vertically spaced tapered roller bearing assemblies 56, 58. Each roller bearing assembly 56, 58 includes an outer race 60 pressfit within a suitable groove 62 formed in the inner periphery of hub 34. Inner races 64 encircle spindle 52 and a plurality of tapered roller bearings 66 run on the races 60, 64. A bolt 70 is disposed in a threaded bore 72 formed in spindle 52. The bolt holds a plate 74 in engagement with inner race 64 of the top bearing assembly. The tapered roller bearings in co-action with the races and plate 74 support and fix the spindle 52 within the hub 34. Preloading adjustment of the roller bearings is easily and readily accomplished by bolt 70. Tightening bolt 70 exerts a force on race 64 which in turn preloads the tapered roller bearing assemblies. Bolt 70 serves as a single securement and adjustment member. Access to the adjustment bolt 70 is had through aperture 38. Aperture 38 is in turn closed and sealed by a resilient, metal cap or cover 78. Cover 78 is snapped into aperture 38 and held against the grooved sidewalls of the aperture.

As seen in FIG. 2, vertical flange 50 of carrier 42 telescopes within and overlaps with the depending annular skirt 32 of base plate 16. A suitable rotary seal 80 is carried by depending skirt 32 and sealingly engages the outer peripheral surface 82 of vertical flange 50. Seal 80 may be of any suitable type. As illustrated, seal 80 includes a carrier 84, a resilient sealing member 86 and a garter spring 88. Spring 88 biases sealing member 86 into sealing engagement with surface 82.

Base plate 16 and carrier 42 define a drive housing or chamber 90 which contains a suitable amount of liquid lubricant. The housing is filled with lubricant to a level indicated by the dotted line 92 in FIG. 2.

Formed as part of the inner peripheral surface 94 of vertical flange 50 is a ring gear 96. Motor 22 is secured to the base plate 16. Vertically oriented output shaft 24 is supported by suitable ball bearing structure 98 and has secured thereto a pinion gear 100. Pinion gear 100 meshes with the ring gear 96 and the motor is offset from the vertical centerline of the carrier 42 (FIG. 3) and hence the vertical centerline of the rotary floor treating element 30. A rotary seal 104 is disposed within aperture 36 and engages the shaft 24 to prevent loss of lubricant through the shaft opening. It is preferred that carrier 42 be die cast and machined to form gear 96 integral therewith. In the alternative, gear 96 could be a separate element secured to and carried by flange 50.

As should be readily apparent, rotary motion of the output shaft 24 is transmitted to the carrier 42 and hence the floor treating element 30 through pinion gear 100 and ring gear 96. Offsetting of the motor relative to the vertical centerline of the carrier 42 reduces the overall height of the polisher when compared to prior co-axially aligned motor and multiple gear set reduction units.

Figure 3:
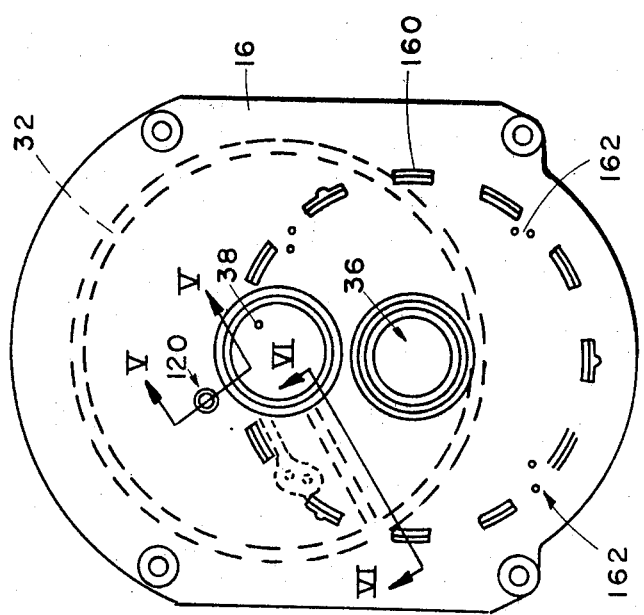
FIG. 3 is a top, plan view of a base plate incorporated in the present invention.

In order to prevent pressure build up within chamber 90 during machine operation, the chamber is communicated with atmosphere through a breather hole 120. As seen in FIGS. 3, 4 and 5, plate 16 is cast with an integral generally tubular member 122. Tubular member 122 defines a through bore 124 which opens at one end within the housing or chamber 90 and at the other end defines the breather hole 120. A suitable, resilient cap 126 (FIG. 5) having a reduced aperture 127 is snap fit into a suitable groove 128 formed in the upper surface of the base plate 16 and surrounding opening 120. Tubular member 122 extends into chamber 90. The length dimension and positioning are such that the quantity of lubricant within the chamber will assume a level below the open end of the bore 124 when the polisher is in a normal position or turned on its side, front, back or upside down. As seen in FIG. 4, the tubular member 122 is preferably formed integral with and immediately adjacent hub 34. Tubular element 122 is positioned relative to the hub so that if the housing is turned on its side or front or rear ends, the lubricant will collect at a point below or to the side of the bore 124.

As a result of the dimensioning and positioning of the tubular element 122, the floor polisher may be stored in any position without leakage of lubricant from the housing chamber 90. When the unit is tipped on its side or turned over, lubricant may drain or drip towards the base plate 16 along the outer peripheral surface of the hub 34. In order to prevent drippage of the lubricant through the bore 124, end 129 of the tubular member is chamfered so as to define a channel 132 between bore 124 and the hub 34. This is best seen in FIG. 5. Channel 132 permits the lubricant to drain away from the bore 124.

As should be apparent from FIG. 2, lower tapered roller bearing assembly 58 is bathed in the lubricant contained within the housing 90. However, due to the level of lubricant within the housing 90, upper roller bearing assembly 56 would not be lubricated. In accordance with the present invention, provision is made for directing lubricant within the housing into hub 34 to lubricate upper roller bearing assembly 56. This feature of the invention eliminates the need to pack upper roller bearing assembly 56 with grease in order to insure that it is lubricated. This feature of the present invention simplifies maintenance of the floor polisher and insures increased reliability.

As seen in FIGS. 2, 4, 6 and 7, base 16 is cast with a baffle plate 142 which extends radially outwardly from hub 34 to the inner surface of annular skirt 32. Baffle plate 142 is stepped in configuration, as seen in FIGS. 2 and 6. The plate is configured so as to extend outwardly in closely spaced relationship with bottom wall 48 of carrier 42 and includes a vertical edge 144 which passes immediately in front of ring gear 96 and a horizontal edge 146 which passes immediately adjacent and overlies the upper surface 147 of vertical flange 50. Circumferentially positioned about hub 34 from the baffle plate 142 in spaced, parallel relationship thereto is another baffle plate 152. Baffle plate 152 extends generally radially outwardly from the hub 34 towards skirt 32 and terminates at a point adjacent ring gear 96. As best seen in FIG. 2 and in the preferred form, the vertical height or dimension of baffle 152 is such that it extends below the horizontal plane defined by the top surface of the annular flange 50 and terminates in closely spaced relationship with bottom wall 48. As seen in FIGS. 2 and 4, hub 34 defines an oil or lubricant inlet 154 and a lubricant outlet 156. Inlet 154 communicates the space within housing chamber 90 between the parallel baffle plates 142, 152 with the interior of the hub 34. Outlet 156 communicates the interior of hub 34 with chamber 90 at a point opposed or immediately opposite inlet 154. Baffle plates 142, 152 in effect define a reservoir space 158 therebetween.

During operation of the floor polisher, the carrier and ring gear 96 will be rotated in a counterclockwise direction with respect to base plate 16 when viewed in FIG. 3. Due to friction and boundary layer effects, the liquid lubricant within the housing 90 will move with carrier 42. Centrifugal effects will cause the lubricant level to increase adjacent the vertical flange 50 and the inner periphery of depending skirt 32. As the lubricant is moved with the carrier, it will engage baffle plate 142 and be wiped from the carrier due to the reduced clearance space between the baffle plate 142 and carrier 42, especially at flange 50. The lubricant will collect in space 158 defined by baffle plate 142 and baffle plate 152. As the lubricant collects within this reservoir space 158, its height will increase until the lubricant flows under the action of gravity through the inlet 154 and into the upper portion of the hollow hub 34. The lubricant will then flow over, around and down upper bearing assembly 56. The excess lubricant passed into hub 34 by the baffle structure will exit from the hub through outlet 156. Baffles 142, 152, inlet 154 and outlet 156 insure a continuous flow of lubricant shortly after operation of the polisher commences through the hub to insure complete and adequate lubrication of upper bearing assembly 56. This feature of the invention insures quiet, reliable operation of the polisher. Maintenance is simplified since there is no longer a need to pack the upper bearing assembly with grease. The baffle structure insures that an adequate supply of lubricant is supplied to the bearing assembly at all times. As seen in FIGS. 4 and 7, breather element 122 is circumferentially spaced from baffles 142, 152 along hub 34 in a direction opposite the direction of rotation of the carrier 42. This position also insures that lubricant will not enter breather bore 124 during normal operation of the polisher.

The unique polisher and drive in accordance with the present invention is easily manufactured employing conventional die casting and machining techniques. Plate 16 and carrier 42 are die cast and then machined to exact dimensions. Die casting permits the plate 16 to be formed with motor support tabs or lugs 160 (FIGS. 1 and 3). The spaced tabs 160 define cooling air passages with the motor housing 20. Also, plate 16 is drilled at suitable locations 162 to permit bolting of the motor to the top surface of the plate. Baffle 152 at its outer terminal portion 164 is illustrated as being generally egg-shaped in plan (FIG. 4). The baffle defines a boss for mounting of the electric motor. Should the mounting holes be formed in a different pattern on plate 16, baffle 152 may be cast as a simple planar element.

The floor polisher and drive unit in accordance with the present invention is of a reduced complexity when compared to the prior polisher units heretofore proposed. The number and complexity of the parts is reduced and a compact, reliable polisher results. The lubricant within chamber 90 insures quiet, reliable operation of the structure as well as increased life from that heretofore provided. Lubrication of the bearings supporting the spindle within the hub is insured thereby further reducing the noise levels associated with polisher operation. Quick access may be had to the adjustment bolt 70 in order to adjust the bearing preload.

In view of the foregoing description, those of ordinary skill in the art will undoubtedly envision various modifications to the present invention which would not depart from the inventive concepts disclosed herein. For example, the exact positioning and configuration of baffles 142, 152 could be varied from that illustrated while still achieving the same desired results of causing liquid lubricant to collect and flow over the upper bearing assembly. Therefore, it is expressly intended that the above description should be considered as that of the preferred embodiment. The true spirit and scope of the present invention may be determined by reference to the appended claims.

The embodiments of the invention in which an exclusive property or privilege is claimed are defined as follows.

1. A drive for a compact rotary floor maintenance device, comprising:
   a motor support base having a depending, annular skirt and a depending hub concentric with said skirt, said base having a motor shaft aperture therein;
   a carrier having a generally vertical annular flange and a centrally disposed spindle, said spindle extending into said hub;
   means within said hub for supporting said spindle for rotary motion, said carrier and said skirt defining a drive housing within which a liquid lubricant may be disposed;
   a ring gear on said annular flange and engageable by a pinion gear secured to a motor shaft extending through the motor shaft aperture;
   seal means carried by one of said annular skirt and said flange for sealing lubricant within said carrier to prevent leakage of lubricant between said skirt and said annular flange; and
   baffle means within said housing for collecting and directing lubricant within the housing into said hub during rotary motion of said carrier for lubricating said means for supporting said spindle for rotary motion.

2. A drive as defined by claim 1 wherein said means for supporting said spindle comprises:
   a pair of vertically spaced, tapered roller bearing assemblies, each assembly including an outer race carried by said hub, an inner race engaging and surrounding said spindle and a plurality of tapered roller bearings positioned between and riding on said races; and
   adjustment means carried by said spindle for adjusting the preload on said bearing assemblies.

3. A drive for a compact rotary floor maintenance device, comprising:
   a motor support base having a depending, annular skirt and a depending hub concentric with said skirt, said base having a motor shaft aperture therein;
   a carrier having a generally vertical annular flange and a centrally disposed spindle, said spindle extending into said hub;
   means within said hub for supporting said spindle for rotary motion, said carrier and said skirt defining a drive housing within which a liquid lubricant may be disposed;
   a ring gear on said annular flange and engageable by a pinion gear secured to a motor shaft extending through the motor shaft aperture;

seal means carried by one of said annular skirt and said flange for sealing the space between said flange and said skirt to prevent leakage of lubricant therethrough; and means within said housing for directing lubricant within the housing into said hub for lubricating said means for supporting said spindle for rotary motion, said means for directing lubricant comprising:

baffle means carried by said base plate for baffling lubricant moved with the carrier, collecting the lubricant and directing the lubricant towards the hub, said hub defining a lubricant inlet at said baffle means and a lubricant outlet whereby lubricant may pass through said hub and lubricate said spindle supporting means.

4. A drive as defined by claim 3 wherein said baffle means comprises:

a first baffle plate extending radially outwardly from said hub and terminating at said skirt; and a second baffle plate circumferentially spaced from said first baffle plate, extending from said hub and terminating adjacent said vertical flange, said baffle plates defining a reservoir for the collection of lubricant carried with said brush carrier.

5. A drive as defined by claim 4 wherein said means for supporting said spindle comprises:

a pair of vertically spaced, tapered roller bearing assemblies, each assembly including an outer race carried by said hub, an inner race engaging and surrounding said spindle and a plurality of tapered roller bearings positioned between and riding on said races; and adjustment means carried by said spindle for adjusting the preload on said bearing assemblies.

6. A drive as defined by claim 5 wherein said hub opens through the top surface of said motor support base, said adjustment means being accessible through said hub from the top surface of said base, said drive further including a removable closure plate carried by said base for closing said hub at its upper end.

7. A drive as defined by claim 3 wherein said hub opens through the top surface of said motor support base, said adjustment means being accessible through said hub from the top surface of said base, said drive further including a removable closure plate carried by said base for closing said hub at its upper end.

8. An improved compact floor polisher of the type including an electric motor secured to a base plate and having a vertically disposed output shaft, a handle connected to the base plate, a polishing brush and drive means for interconnecting the output shaft of the motor to the polishing brush to rotate the brush, said drive means comprising:

a brush carrier having a generally vertically annular flange and a vertically extending spindle, said brush being secured to said carrier for rotation therewith, said base plate including a depending skirt concentric with said carrier and surrounding said carrier flange;

a hub having a through bore and extending downwardly from said base plate, said spindle disposed within said through bore of said hub;

bearing means within said hub and connecting said spindle to said hub for rotary motion relative thereto;

rotary seal means between said vertical flange and said skirt for sealing the space between said flange and said skirt, said carrier and said base defining a drive housing for containing a liquid lubricant; and means within said housing for defining a reservoir space for collecting and directing lubricant moving with said brush carrier during rotation of said brush into an upper portion of said hub to lubricate said bearing means.

9. An improved compact floor polisher of the type including an electric motor secured to a base plate and having a vertically disposed output shaft, a handle connected to the base plate, a polishing brush and drive means for interconnecting the output shaft of the motor to the polishing brush, said drive means comprising:

a brush carrier having a generally vertical annular flange and a vertically extending spindle, said brush being secured to said carrier for rotation therewith, said base plate including a depending skirt concentric with said carrier and surrounding said carrier flange;

a hub having a through bore and extending downwardly from said base plate, said spindle disposed within said through bore of said hub;

bearing means within said hub and connecting said spindle to said hub for rotary motion relative thereto;

rotary seal means between said vertical flange and said skirt for sealing the space between said flange and said skirt, said carrier and said base defining a drive housing for containing a liquid lubricant; and means within said housing for directing lubricant into an upper portion of said hub to lubricate said bearing means, said means for directing lubricant comprising:

a pair of circumferentially spaced baffles extending outwardly from said hub, said hub defining a lubricant inlet communicating said housing with said hub bore between the baffles, said baffles dimensioned so that as the carrier rotates lubricant moved along therewith will collect between the baffles and flow through the inlet into the hub bore and lubricate the bearings.

10. A compact drive for use with a motor having a pinion gear rotated by the motor output shaft, said drive adapted for use in a floor polisher and comprising:

a base plate to which the motor may be mounted and having a depending, generally circular skirt and a hollow hub concentric with said skirt;

a carrier having a peripheral, vertical flange disposed within the skirt and defining a lubricant housing therewith, said carrier including a spindle concentric with the flange and extending within the hub;

bearing means within the hub connecting the carrier to the base plate for relative rotation therewith;

a ring gear on an inner peripheral surface of said vertical flange, said base plate including a motor shaft aperture therethrough positioned so that the pinion gear on the output shaft will engage the ring gear;

a seal supported by said skirt and engaging the outer peripheral surface of the vertical flange; and baffle means within said housing and extending from said hub towards said carrier vertical flange for directing lubricant within the housing into the hub to lubricate the bearing means during rotation of said carrier.

11. A compact drive for use with a motor having a pinion gear rotated by the motor output shaft, said drive adapted for use in a floor polisher and comprising:

a base plate to which the motor may be mounted and having a depending, generally circular skirt and a hollow hub concentric with said skirt;

a carrier having a peripheral, vertical flange disposed within the skirt and defining a lubricant housing therewith, said carrier including a spindle concentric with the flange and extending within the hub;

bearing means within the hub connecting the carrier to the base plate for relative rotation therewith;

a ring gear on an inner peripheral surface of said vertical flange, said base plate including a motor shaft aperture therethrough positioned so that the pinion gear on the output shaft will engage the ring gear;

a seal supported by said skirt and engaging the outer peripheral surface of the vertical flange; and means within said housing for directing lubricant within the housing into the hub to lubricate the bearing means, said lubricant directing means comprising:

a first baffle extending radially outwardly from the hub within said housing and terminating adjacent the vertical flange; and a second baffle extending outwardly from the hub and terminating adjacent the skirt, said second baffle positioned circumferentially from the first baffle in the direction of carrier rotation, said first and second baffles defining a reservoir for collection of lubricant and said hub defining an inlet opening between the baffles and communicating the interior of the hub with the housing.

12. A compact drive as defined by claim 11 wherein the hub defines an outlet communicating the hub interior with the housing, said outlet being positioned opposite of said inlet.

13. A compact drive as defined by claim 12 wherein the carrier includes a bottom wall connecting the vertical flange to the spindle, said first and second baffles extending downwardly from the base plate along said carrier bottom wall in closely spaced relationship thereto.

14. A compact drive as defined by claim 13 wherein said bearing means comprises:

upper and lower, vertically spaced bearing assemblies, each assembly including an inner race surrounding said spindle and an outer race carried by said hub; and adjustment means carried by the upper end of said spindle and engaging the inner race of the upper bearing assembly for adjusting the preload on said bearing assemblies.

15. A compact drive as defined by claim 14 wherein said hub opens through the top surface of said base plate whereby said adjustment means is accessible through said hub from the top surface of the base plate and further including a removable closure carried by said base for closing said hub bore.

16. A compact drive as defined by claim 15 wherein said inlet opening is adjacent said base plate so that lubricant is directed over said upper bearing assembly.

17. An improved drive for a rotary floor treating machine of the type including a base, a motor having a vertically oriented output shaft extending through the base and a floor treating element carrier, the base defining a hub, the carrier including an annular flange and a spindle supported within the hub by bearing means, the annular flange and base defining a lubricant housing, said drive further including a pinion gear secured to the output shaft and meshing with a ring gear on the carrier, wherein the improvement comprises:

means within the lubricant housing for collecting and directing lubricant into said hub when the lubricant is moving with the carrier due to friction, boundary layer and centrifugal effects to lubricate said bearing means.

18. An improved drive for a rotary floor treating machine of the type including a base, a motor having a vertically oriented output shaft extending through the base and a floor treating element carrier, the base defining a depending skirt and a concentric hub, the carrier including an annular flange and a spindle supported within the hub by bearing means, the annular flange and skirt defining a lubricant housing, said drive further including a pinion gear secured to the output shaft and meshing with a ring gear on the carrier, wherein the improvement comprises:

means within the lubricant housing for directing lubricant into said hub to lubricate said bearing means, said means for directing lubricant comprising:

a pair of circumferentially spaced baffles extending outwardly from said hub, said hub defining an inlet between said baffles and communicating said housing with the interior of the hub, said baffles dimensioned so that as the carrier rotates, lubricant will collect between said baffles and flow through the inlet into the hub and lubricate the bearing means.

19. An improved drive as defined by claim 18 wherein said baffles are positioned in parallel relationship.

20. An improved drive as defined by claim 19 wherein said hub defines an outlet opposite the inlet.

21. An improved drive as defined by claim 20 wherein one of said baffles terminates adjacent said flange and the other of said baffles terminates adjacent said skirt.

22. A drive for a compact rotary floor maintenance device, comprising:

a motor support base having an integral depending, annular skirt and an integral depending hub concentric with said skirt, said base having a motor shaft aperture therein;

a carrier having an integral generally vertical annular flange and a centrally disposed, integral spindle, said spindle extending into said hub, said carrier and said skirt defining a drive housing within which a liquid lubricant may be disposed;

means within said hub for supporting said spindle for rotary motion, said means including a pair of vertically spaced, tapered roller bearing assemblies, each assembly including an outer race carried by said hub, an inner race engaging and surrounding said spindle and a plurality of tapered roller bearings positioned between and riding on said races, and adjustment means carried by said spindle at the upper end thereof and engaging the inner race of the upper bearing assembly for adjusting the preload on said bearing assemblies;

a ring gear on said annular flange and engageable by a pinion gear secured to a motor shaft extending through the motor shaft aperture; and seal means positioned between said annular skirt and said flange and carried by one of said annular skirt and said flange for sealing the space between said flange and said skirt to prevent leakage of lubricant therethrough, said base defining an access aperture spaced from said motor shaft aperture and opening into said hub providing access to said adjustment means and wherein said drive further includes a removable closure carried by said base for closing said access aperture.

23. A drive as defined by claim 22 wherein said ring gear is integral with said annular flange of said carrier.

24. A drive as defined by claim 22 wherein said adjustment means comprises a plate engaging the upper surface of the inner race of the upper bearing assembly and a threaded member extending through said plate and into a threaded bore defined by said spindle.

25. A drive as defined by claim 24 wherein said ring gear is integral with said annular flange of said carrier.

* * * * *